Jan. 23, 1951  C. W. SECTISH  2,539,107
GRINDING MACHINE
Filed April 28, 1948  5 Sheets-Sheet 1

FIG.I.

INVENTOR.
CHARLES W. SECTISH
BY
Ferdinand F. Kopecky.
ATTORNEY.

Jan. 23, 1951 C. W. SECTISH 2,539,107
GRINDING MACHINE

Filed April 28, 1948 5 Sheets-Sheet 3

INVENTOR.
CHARLES W. SECTISH
BY
Ferdinand H. Kopecky.
ATTORNEY.

Jan. 23, 1951 C. W. SECTISH 2,539,107
GRINDING MACHINE
Filed April 28, 1948 5 Sheets-Sheet 4

INVENTOR.
CHARLES W. SECTISH
BY
Ferdinand H. Kopecky.
ATTORNEY.

Jan. 23, 1951   C. W. SECTISH   2,539,107
GRINDING MACHINE

Filed April 28, 1948   5 Sheets-Sheet 5

INVENTOR.
CHARLES W. SECTISH
BY
Ferdinand F. Kopecky
ATTORNEY.

Patented Jan. 23, 1951

2,539,107

UNITED STATES PATENT OFFICE 2,539,107

GRINDING MACHINE

Charles W. Sectish, Passaic, N. J.

Application April 28, 1948, Serial No. 23,705

3 Claims. (Cl. 51—56)

The present invention relates to machines for finishing, particularly beveling and polishing, the edges of sheets or plates of glass and similar ceramic materials, metals, wood and plastics and provides a machine which, as a single unit, may be operated to bevel large or small glass plates or sheets with equal facility and efficiency and which may be operated also to grind and polish the edges of such glass plates, either in one or in separate operations.

It is a principal object of the present invention to provide a machine for grinding bevels on glass plates and for grinding and polishing other kinds of edges on glass plates, which machine is capable of producing uniform bevels without wavy contours much more efficiently and advantageously than has heretofore been possible.

It is a further object of the invention to provide such a machine which is capable of producing beveled glass plates of greater uniformity, precision and accuracy than has heretofore been possible.

Other objects and advantages of the invention, some of which are referred to more specifically hereinafter, will be apparent to those skilled in the art to which this invention pertains.

Heretofore no machine for beveling large plates of glass in a satisfactory manner has been available. The portable grinding wheels and machines having flexible abrasive belts that were available are far from satisfactory. Bevels cut with such machines are wavy and not uniform, since it is apparent that a slight tilt or shift of the machine or the glass plate or the abrasive belt or a small lack of perfect flatness of the grinding wheel or belt or lack of uniformity in its rotation will produce imperfections in the finished glass plate that are magnified enormously. Any waviness in beveled edges is particularly noticeable and is undesirable but was heretofore difficult, if not impossible, to avoid.

Heretofore in grinding bevels and edges of large glass plates with grinding wheels, the normal procedure involved using the grinding wheel on the top surface of the glass. It is much less convenient to work under the bottom surface of the glass plate or to move the large plate of glass over a fixed rotating grinding wheel.

Although much breakage in attempts to bevel the edges of large glass plates was always considered unavoidable, I have discovered that much of this breakage resulted not merely from the difficulty in handling the large glass plates but from the way in which the wheel and the glass were held with respect to each other. I have found that if glass plates are ground from the bottom surface and that, if the particles resulting from the grinding are continuously removed, breakage or cracking is reduced considerably and the ground surfaces are much more uniform. When glass plates are manually handled during the grinding, such as when portable grinding wheels or machines in which the glass must be manually supported are used, any slight irregularity in movement of the glass plate creates new scratches and scuffs which must later be polished out. Besides resulting in imperfect bevels and imperfect surfaces, such polishing is an additional item of expense.

I have also discovered that if the main portion of the grinding is carried out not with the outer periphery of the grinding wheel, which is the normal method, but on the side face of the wheel, not only is it normally possible to subject the glass to a larger grinding surface, but the grinding is much more uniform. Thus, when the periphery of the wheel is used for the grinding, the contact between the glass and the wheel is along a line of the wheel and, if the wheel is not perfectly circular or the wheel or the glass should move slightly out of their respective planes, the succeeding line cut will be either deeper or shallower than the preceding; waviness of the ground surface is difficult to avoid when the periphery of the wheel is used for the grinding.

I have also discovered that much of the difficulty in the grinding of edges on glass plates, especially in such operations as beveling, where slight faults or irregularities are magnified many fold, can be avoided by using abrasive wheels in which the abrasive is bonded in hard metals, for example, wheels in which the bond or matrix is brass, tungsten alloy or similar hard, high-melting metals, and the abrasive is preferably diamond particles. Wheels in which the bonding element is a resin are much less satisfactory for use since the abrasive particle is loosened in such a matrix and thereby grinds less sharply and uniformly; the abrasive particle appears to act as if it were floating in a pool of molten resin. Furthermore, in metal-bonded abrasive wheels there is little possibility of the sharp edges of the abrasive becoming coated or covered with films or particles of the matrix or bonding substance and thereby losing a portion or all of their grinding efficiency, either temporarily or permanently.

The machine of my invention attains all the foregoing objects and embodies all of the foregoing discoveries. In addition, the machine is so constructed that any desired angle or degree of bevel or depth of grind can be obtained with a minimum of adjustments and these adjustments can be made so precisely that irregularities and imperfections in the finished glass plate are minimized to a great degree.

In the machine of the present invention the grinding and polishing wheels are mounted in such a manner with respect to the glass surfaces that are to be subjected to grinding that the wheels grind from the same center. It is possible to adjust or set the grinding wheels in such a manner that almost any angle and depth of bevel can be obtained without moving the glass plate. As a result of this construction, small errors in adjustment of each of the plurality of wheels are thereby minimized.

By using the entire or the greater portion of the side face of the grinding wheel the uniformity of the grinding surface is maintained and it is not necessary to replace, reshape or true the wheels as frequently as is the case when the periphery of the wheel or cone-shaped wheels are used.

The machine is provided with conduits for liquids so that water or other liquid may be continuously charged or sprayed onto the grinding surfaces. This liquid washes away and removes grit, loose polishing material, and ground glass from the zone of grinding and thereby prevents scuffing of the glass, soiling the glass or the operator, and reduces flying dust during the use of the machine. The liquid has another and perhaps more important function in that it cools the surfaces and dissipates some of the heat produced during grinding and prevents local overheating and cracking of the glass.

The machine is adapted to the production of flat polished edges, seamed edges, swiped edges, mitered edges and beveled edges of any angles or depths as these terms are understood in the art and as will be apparent from the machine and its method of operation as disclosed hereinafter.

Figure 1 of the drawings is a fragmentary top plan view of a machine constituting a preferred embodiment of my invention.

Figure 1:
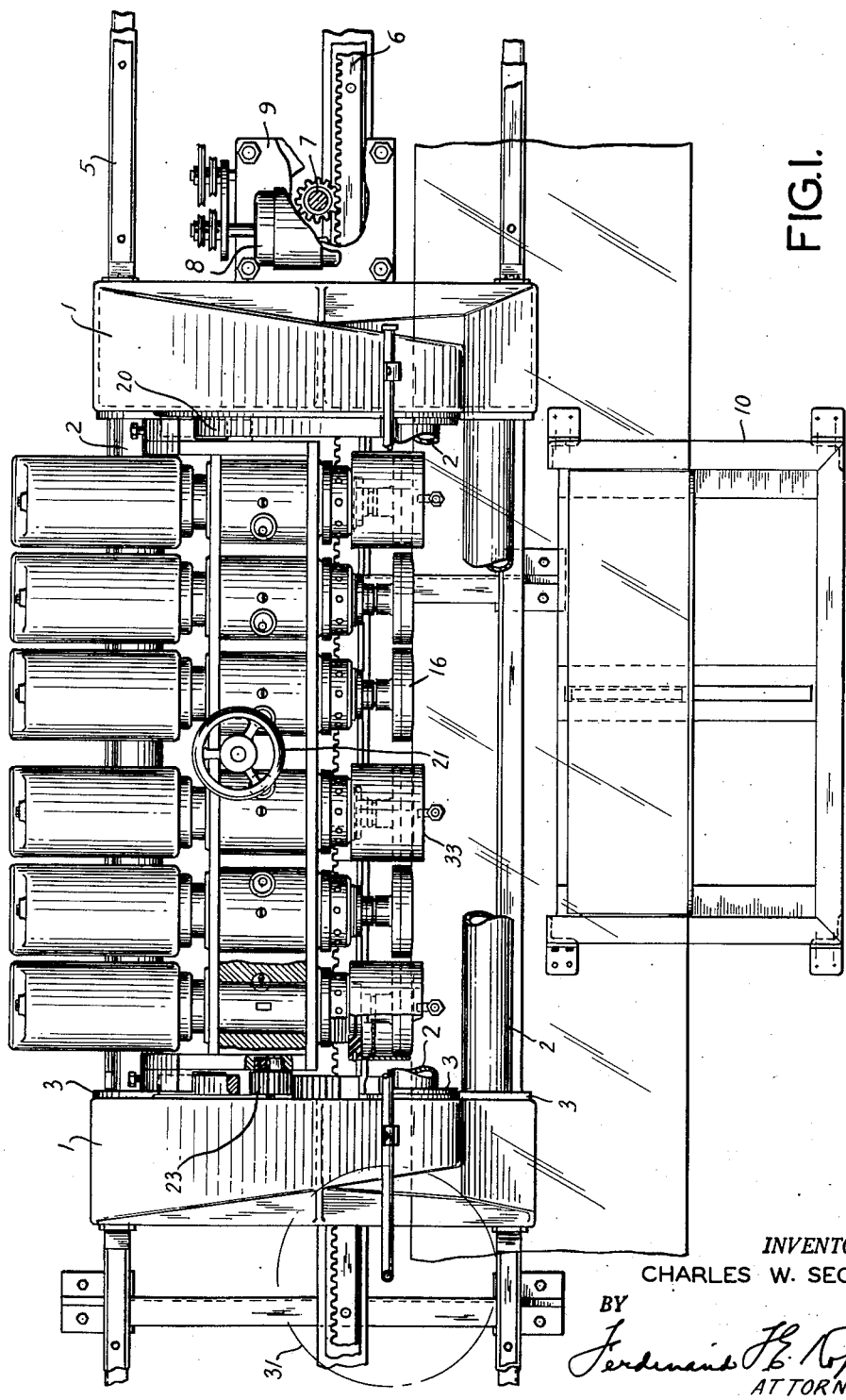
Figure 2:
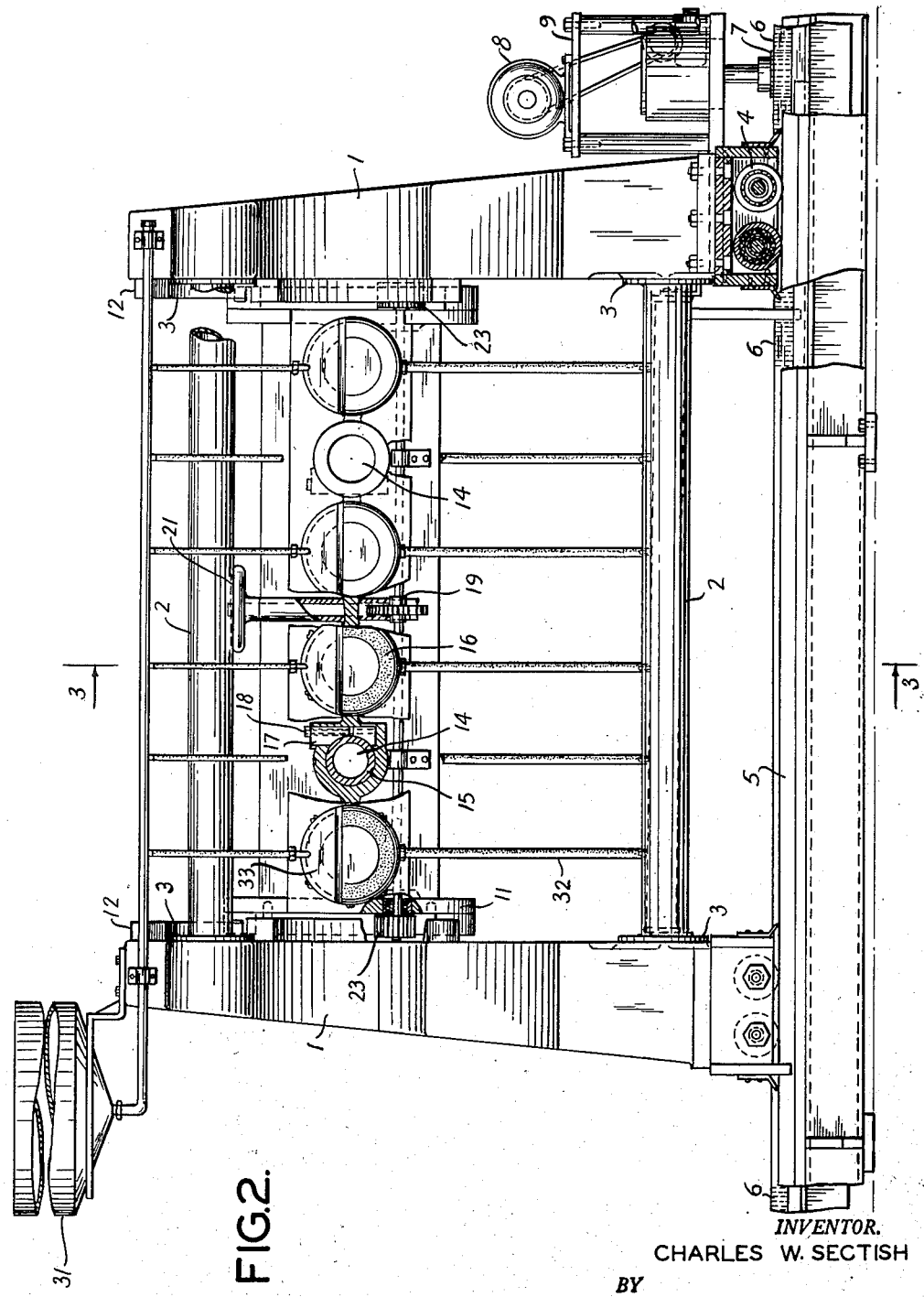
Figure 2 is a fragmentary front plan view of the same machine.
Figure 3:
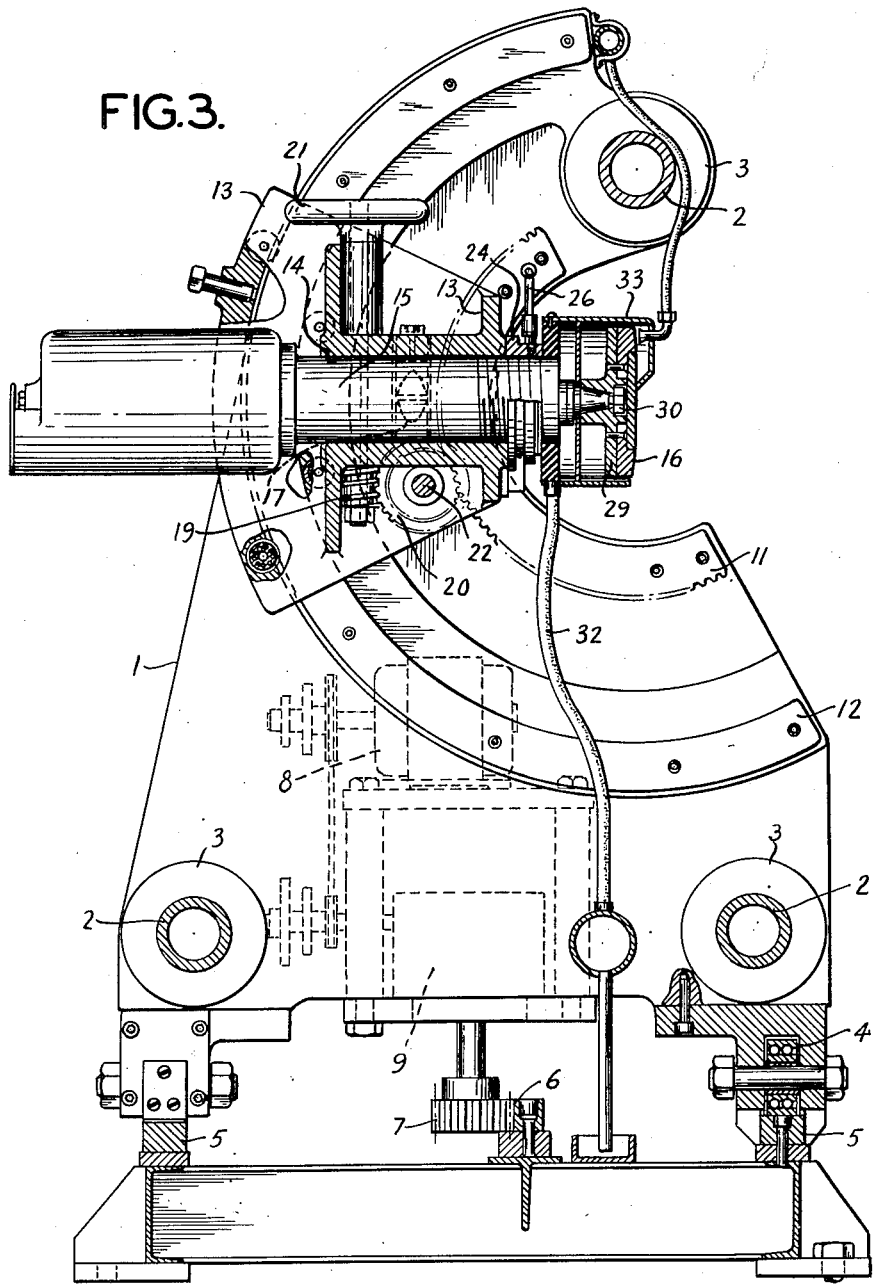
Figure 3 is a fragmentary side sectional plan view of the same machine from section 3—3 of Figure 2.

The machine consists of a frame comprising two end castings 1 bolted together through three flanged tubes 2 at flanges 3. The two end castings are supported on roller-bearing wheels 4 moving on a continuous track 5. Between the two tracks 5 is a continuous gear rack 6 upon which travels gear 7 driven by motor 8 through speed-reducing gear box 9 attached to one of the end castings 1. This gear 7 moves the entire grinding machine continuously with respect to a stationary table 10 upon which is placed the glass to be ground.

Mounted on each of the end castings 1 is an arcuate rack toothed gear 11 and guide ring 12 in which is supported a motor spindle block 13. This motor spindle block is provided with holes 14 in which are fitted and mounted transversely the motor-driven spindles 15 that drive the grinding wheels 16. These holes 14 may be bored with a uniform but slight deviation from the true perpendicular so that the spindles 15 and the surfaces of the grinding wheels 16 are slightly canted in a direction such that the wheels make their first contact with the glass not on their circumference or periphery but on the flat side face surface. The spindles 15 consist of a housing in which is a rotating shaft connected to the grinding wheel 16. The housing and the shaft are referred to generally throughout this description as the spindle 15. The ring gear 11 or the guide ring 12 may be graduated in angular degrees or other suitable units; this is not represented in the drawings.

Within each hole 14 of motor spindle block 13 is a locking device 17 for fastening or seating the spindle 15 in the block. This locking device consists of two metal pieces fitting into a hole bored into the block 13 which are clamped together with a tightening bolt 18.

The motor spindle block 13, in which the spindles 15 and the grinding wheels 16 are mounted, may be set at various angles to provide different degrees of grinding with respect to the glass plate by means of a worm 19 and an intermediate pinion gear 20 that engages with the arcuate rack toothed gear 11. The worm 19 is rotated by hand wheel 21 or other device and the intermediate pinion gear 20 engages through a longitudinal shaft 22 with pinion gears 23 on each end of the shaft 22 that engage with the arcuate rack toothed gears 11. A set screw such as is represented on Figue 3, may be provided to lock the motor spindle block 13 in position.

The portion of the spindle housing 15 nearest the grinding wheel is threaded. Fitting into these threads and over the ground and polished face of the spindle hole 14 is a micrometer adjustment nut 24 that is preferably graduated with respect to the thread on the spindle housing 15 in thousandths of an inch. To permit setting and adjustment of the spindle 15 and thereby advance or set back the grinding wheel 16, the adjustment nut 24 is provided with notches 25 and a ratchet lever 26 having a compression spring 27 for turning or rotating the micrometer adjustment nut 24. The lower end of the ratchet 26 engages and disengages with the notches 25 in the micrometer adjustment nut 24. Two or more set screws 28 guide and support the mounting of the ratchet lever 26.

The grinding wheels 16 are attached and held to face plates 29 which are set on the tapered end of the spindle shaft 15 and which face plate is held at the end of the shaft by nut 30. Conventional means of fastening the grinding wheel to this face plate 29 are used; these may be either bolts or cementing means and there may be coil springs or flexible rubbery interlayer plates or cushions between the face plate 29 and the grinding or polishing wheels 16. The drawings are not intended to shown any preference of one type of fastening over another in this respect. In place of a grinding wheel 16, a polishing or buffing wheel, such as one of cork or abrasive-impregnated cork or a rouge-charged belt wheel may be used and, when four or more units are used so that a complete series of grinding, buffing, and polishing operations are completed with one run of the machine past the glass plate on the stationary table 10, at least one of the last wheels in the series is generally a polishing wheel.

Figure 4:
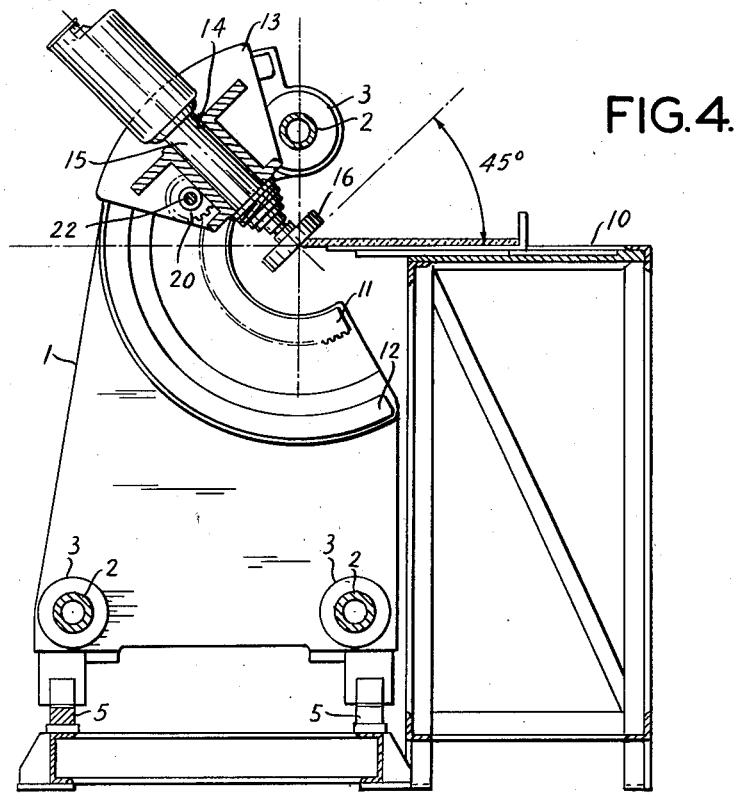
Figures 4, 5 and 6 are fragmentary side sectional views of the same portion of the machine from section 3—3 of Figure 2 showing the arrangement of the grinding wheels at various angles of grinding.
Figure 5:
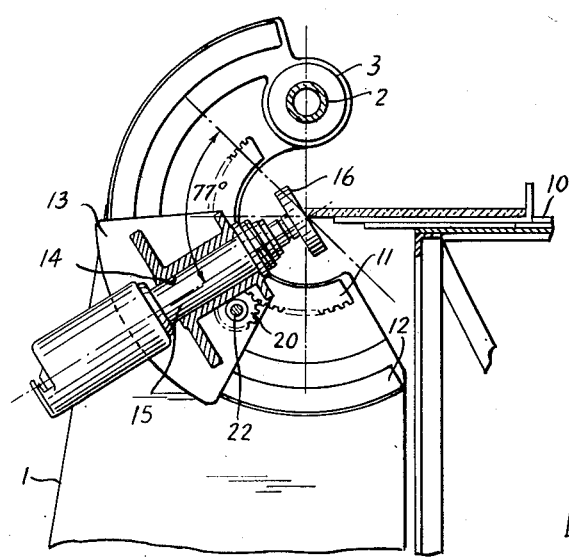
Figure 6:
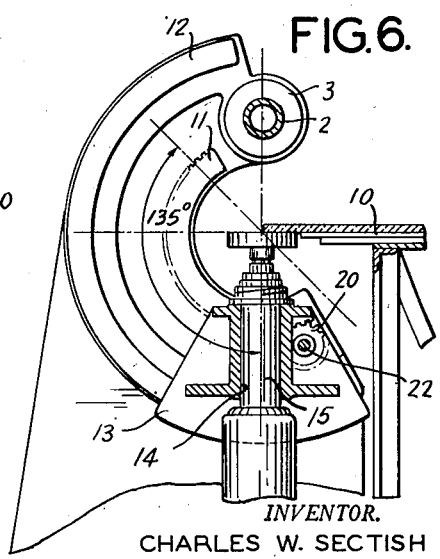
Figure 7:
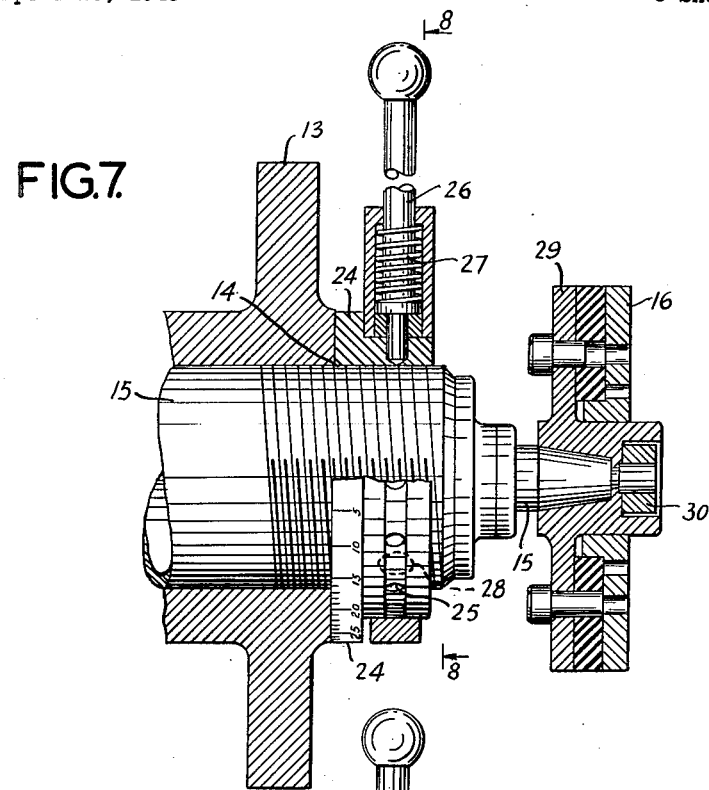
Figure 7 is a fragmentary side plan view of a grinding wheel and spindle showing the micrometer adjusting nut.
Figure 8:
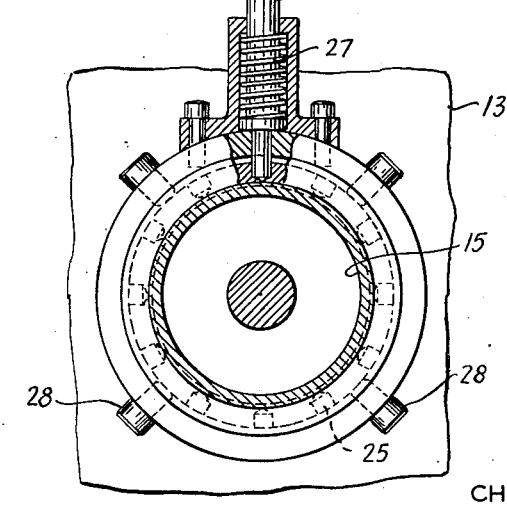
Figure 8 is a front sectional view of the ratchet lever shown in Figure 7 from section 8—8 of Figure 7.

The accuracy of the adjustments of the grinding surfaces 16 with respect to the glass plate on the stationary table 10 can be appreciated from Figures 4, 5 and 6. These show the arrangement of the grinding surfaces 16 of my machine. The stationary table 10 is of such height and so placed that the top or working surface of the table is directly in the center of the spindle shaft 15 so that the bottom surface of the glass on the stationary table 10 is thus directly at the said common center. When the motor spindle block 13 is moved to tilt the grinding surface 16 by turning the hand wheel 21, the center is not thereby changed with respect to the glass on the table 10. The center of the faces of the grinding wheels 16 is the center of the arc or longitudinal axis about which the spindle 15 may be rotated, when the spindles 15 are properly set in the spindle block 13.

As illustrated in the drawings, the machine is provided with a water or liquid tank or reservoir 31 having pipes or conduits for directing a flow of liquid to each of the grinding surfaces 16. These pipes may be provided with pet cocks, spray nozzles or other suitable controls of the liquid streams to each of the grinding surfaces, so that the wheels and the glass being ground may be continually wetted and washed. Drainage pipes or conduits 32 for draining off the excess and waste liquid from the grinding surfaces and shields surrounding said grinding surfaces 33 may also be provided.

The motors driving the spindle shaft 15 may revolve at different speeds, if desired, or may all be of the same capacity and type. The motor 8 which moves the machine with respect to the stationary table 10 should be of sufficient horsepower to produce the desired movement at the desired speed, which can be controlled by the speed-reducing gears 9 or other means such as step-down or variable-speed pulleys.

In the preferred construction of my machine, the stationary table 10 is of relatively large size, preferably about 10 feet by 10 feet square. The machine itself is from 3 to 5 or more feet in length depending upon the number of its grinding wheels. Generally six wheels are desirable but eight and ten may be found necessary for some purposes.

By keeping the glass plate stationary on the table 10 and moving the machine, which is massive and of heavy construction, instead of moving the table and keeping the machine stationary, irregularities and imperfections in the finished grinding are greatly reduced.

Instead of having merely one machine to surface one edge of a glass plate or one edge of several glass plates (superimposed upon each other or consecutively arranged) I contemplate also the use of two or more machines to travel upon separate tracks and to surface two or more edges at the same time, such edges and tracks being either parallel to each other or at different angles to each other.

In operating my machine to produce a bevel upon a plate of glass, the glass plate is placed on the stationary table 10 and is clamped tightly thereto from the top down, preferably by means of an iron plate or bar close to the edge to be ground. The edge of the plate which is to be beveled protrudes over the edge of the table 10. Thereafter, the dip of the spindle block 13 is adjusted by means of hand wheel 21 to the desired angle of bevel. The spindles 15 and grinding wheels 16 are then advanced or set back by means of micrometer adjustment screw 24 to the desired degree to obtain the desired depth of bevel. If the operations of grinding, polishing and buffing are to be done at one run of the machine, the last wheel to contact the edge of the glass plate should be a polishing wheel such as one of rouge-impregnated felt and the preceding wheel a fine abrasive-impregnated cork of a suitable grit size. The other wheels may be conventional glass-grinding wheels or preferably wheels composed of diamond particles in a brass matrix. The motors on the spindles 15 are then started and the motor 8 driving the machine down the track 5 is also started. When the machine reaches the tip of the glass edge it may be necessary to readjust or set the speed of travel of the machine over the track 5 by changing the variable speed controller 9 to obtain the most advantageous grinding action with respect to the particular glass plate. During the grinding, water from reservoir 31 is fed to the individual wheels to wet the grinding surfaces and to wash away grit and other loose particles that form thereon.

Besides grinding and polishing in one plane and in one operation by means of the plurality of grinding wheels 16 mounted in the common spindle block 13, I may mount elsewhere on the machine one or more grinding wheels in separate spindles and at different angles to accomplish, for example in beveling, edge grinding and polishing operations (chamfering, for example) in the same operation without the necessity of remounting the glass plate or changing the adjustment of the spindle block 13. These separate spindles on which may be attached grinding and polishing wheels to grind on their periphery (of flat or cone or wedge-shaped configuration) are preferably mounted on a vertical rib or surface of either or both of the end castings.

Although many of the individual component parts of my machine may be modified or changed in conventional manner, as is obvious in view of the foregoing description and the specified purposes and operations of the various parts, it should however be noted that several parts of the machine of my invention are not intended and cannot advantageously be modified or changed. The most important and novel feature of my machine is the arrangement and mounting of the spindles of the grinding wheels, permitting the machine to be used for the grinding of a wide range of bevels and edges with great accuracy and precision. Instead of the spindle construction represented it is possible to use alternative methods of accomplishing the same purpose, for example, by moving the spindle on threads between its housing and the motor spindle block 13 or by fastening the spindle in the block by manual motion and locking it in the desired position with a set screw.

During the operation of the machine, changes in the adjustments of the grinding wheels, either individually or as a group, can be made to compensate for any wearing away of the surfaces or changes that have occurred during the particular operation without changing the angle of the bevel but merely its depth by means of the micrometer adjustment nut 24.

The grinding wheels 16 in the spindle 15 may be canted slightly as described hereinbefore, so that the first contact made with the glass surfaces to be ground will be on the side face of the wheel rather than on its periphery or circumference, thereby increasing the total grinding surface and the grinding efficiency. However, in some cases, especially with wheels composed of diamond particles in brass, which are not easily deformed and wear but slowly, this cant need not be made, or may be made by simply shaping the face of the wheel so that it is beveled or has a frustro-conical conformation of a satisfactory degree. Alternatively the entire spindle block 13 may be canted by mounting it into one of the end plates 1 slightly lower or higher than the other end plate 1.

Although I have described my invention with particular reference to the grinding of glass, it may obviously be used, by changing, if necessary, the type of abrasive grinding wheels, to bevel and edge marble and other ceramic materials as well as steel and similar metals, wood and plastic materials such as laminated board, and cast resinous sheets or plates.

I claim:

1. A grinding machine which comprises a spindle block mounted in two end supports solely on two fixed arcuate rack toothed gears mounted upon each of the two end supports and without any other pivotal control, a plurality of spindles mounted transversely in the said spindle block, a plurality of rotatable grinding wheels mounted to the said spindles, means on the spindle block for axially adjusting the spindles in the spindle block whereby the tips of the spindles can be aligned on a straight longitudinal pivoting axis, a worm gear mounted on the spindle block, a shaft mounted between the two end supports, a pinion gear mounted at each end of the said shaft and a third pinion gear mounted intermediately of the shaft, the two end pinion gears meshing with the respective arcuate gears, and the intermediate pinion gear meshing with the worm gear, these gears being so arranged as to move and set the spindles at various inclinations without changing their relative position with respect to the said longitudinal pivoting axis.

2. A grinding machine as defined in claim 1 in which the means on the spindle block for axially adjusting the spindles comprises threaded casings.

3. A machine for bevelling and grinding glass plates which comprises a stationary work-holding table for supporting a glass plate, tracks parallel to the said stationary table, two end supports movable along the said tracks, a spindle block mounted between the two end supports solely on two fixed arcuate rack toothed gears thereon without any other pivotal control, a plurality of spindles mounted transversely in the said spindle block, a plurality of rotatable grinding wheels mounted to the said spindles, means on the spindle block for axially adjusting the spindles in the spindle block whereby the tips of the spindles can be aligned on a straight longitudinal pivoting axis which is in the plane of the top of the stationary table, a worm gear mounted on the spindle block, a shaft mounted between the two end supports, a pinion gear mounted at each end of the said shaft and a third pinion gear mounted intermediately of the shaft, the two end pinion gears meshing with the respective arcuate gears, and the intermediate pinion gear meshing with the worm gear, these gears being so arranged as to move and set the spindles at various inclinations without changing their relative position with respect to the longitudinal pivoting axis.

CHARLES W. SECTISH.

REFERENCES CITED

The following references are of record in the file of this patent:

UNITED STATES PATENTS

| Number | Name | Date |
| --- | --- | --- |
| 817,226 | Davis | Apr. 10, 1906 |
| 858,887 | Millen | July 2, 1907 |
| 1,012,227 | Stich | Dec. 19, 1911 |
| 1,797,342 | Hitchcock | Mar. 24, 1931 |
| 1,832,244 | Rosenberg | Nov. 17, 1931 |
| 1,913,781 | Wiley et al. | June 13, 1933 |
| 2,229,281 | Ekholm | Jan. 21, 1941 |

FOREIGN PATENTS

| Number | Country | Date |
| --- | --- | --- |
| 553,972 | Great Britain | June 11, 1943 |